(12) United States Patent
Rejman (10) Patent No.: US 10,027,188 B2
(45) Date of Patent: Jul. 17, 2018

(54) HAND TOOL CASE HOLDING DEVICE

(71) Applicant: Robert Bosch GmbH, Stuttgart (DE)

(72) Inventor: Marcin Rejman, Waiblingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 14/360,261

(22) PCT Filed: Nov. 7, 2012

(86) PCT No.: PCT/EP2012/072000
§ 371 (c)(1),
(2) Date: May 22, 2014

(87) PCT Pub. No.: WO2013/075941
PCT Pub. Date: May 30, 2013

(65) Prior Publication Data
US 2015/0137745 A1 May 21, 2015

(30) Foreign Application Priority Data

Nov. 22, 2011 (DE) .......................... 10 2011 086 825
Jul. 31, 2012 (DE) .......................... 10 2012 213 415

(51) Int. Cl.
*H02J 7/00* (2006.01)
*B65D 83/10* (2006.01)
(Continued)

(52) U.S. Cl.
CPC ................ *H02J 50/90* (2016.02); *B25H 3/02* (2013.01); *H02J 7/0044* (2013.01); *H02J 50/10* (2016.02); *H02J 50/40* (2016.02)

(58) Field of Classification Search
CPC ......... Y02E 60/12; H02J 7/025; H02J 7/0042; H02J 7/0045; H02J 7/0044; H01F 38/14; Y02T 90/122; B60L 11/82; A63H 33/086; B65D 21/0204; B65D 81/361; B65D 21/0219; A47G 19/26; A61B 19/0271; A61B 19/0256; A61B 19/026;
(Continued)

(56) References Cited

U.S. PATENT DOCUMENTS 5,276,310 A * 1/1994 Schmidt .................. F27B 17/00
219/386
6,218,796 B1 4/2001 Kozlowski
(Continued)

FOREIGN PATENT DOCUMENTS

CN 1814415 A 8/2006
CN 102077304 A 5/2011
(Continued)

*Primary Examiner* — Yalkew Fantu
*Assistant Examiner* — Mohammed J Sharief
(74) *Attorney, Agent, or Firm* — Norton Rose Fulbright US LLP; Gerard Messina (57) ABSTRACT

A hand tool case holding device including a holding device housing, a case accommodating area, and a charging coil, which is provided for the purpose of transferring energy into a hand tool case situated in the case accommodating area. It is provided that the hand tool case holding device includes a holding device, which is provided for the purpose of detachably fixing at least the holding device housing independently of the hand tool case.

15 Claims, 5 Drawing Sheets

(51) Int. Cl.
*B65D 25/24* (2006.01)
*B65D 90/12* (2006.01)
*H02J 50/90* (2016.01)
*H02J 50/10* (2016.01)
*H02J 50/40* (2016.01)
*B25H 3/02* (2006.01)

(58) Field of Classification Search
CPC ...... A61B 19/0288; A61L 2/26; H01M 10/44; H01M 10/46
USPC .............. 320/108, 107, 115; 206/370, 501; 220/630, 636
See application file for complete search history.

(56) References Cited

U.S. PATENT DOCUMENTS

| | | | |
|---|---|---|---|
| 6,626,479 B1 * | 9/2003 | Skoug | B60R 9/00 224/404 |
| 7,462,951 B1 | 12/2008 | Baarman | |
| 8,228,026 B2 * | 7/2012 | Johnson | A47B 96/02 320/108 |
| 2002/0008044 A1 * | 1/2002 | Burrus, IV | B25H 3/02 206/373 |
| 2009/0212639 A1 * | 8/2009 | Johnson | H02J 5/005 307/104 |
| 2009/0212737 A1 * | 8/2009 | Johnson | A47B 96/02 320/108 |
| 2010/0212338 A1 * | 8/2010 | Hermann | B60H 1/00278 62/118 |
| 2012/0153731 A9 * | 6/2012 | Kirby | G06K 7/0008 307/104 |

FOREIGN PATENT DOCUMENTS

| | | |
|---|---|---|
| DE | 20319877 U1 | 5/2005 |
| DE | 10 2008 058007 | 4/2010 |
| EP | 0 533 247 | 3/1993 |
| EP | 1 563 965 | 8/2005 |
| EP | 2 289 671 | 3/2011 |
| JP | 2010064227 A | 3/2010 |
| KR | 2011 0107728 | 10/2011 |

* cited by examiner

HAND TOOL CASE HOLDING DEVICE

FIELD OF THE INVENTION

The present invention relates to a hand tool case holding device including a holding device housing, a case accommodating area, and a charging coil, which is provided for the purpose of transferring energy into a hand tool case situated in the case accommodating area.

BACKGROUND INFORMATION

It is believed that a hand tool case holding device including a holding device housing, a case accommodating area, and a charging coil, which is provided for the purpose of transferring energy into a hand tool case situated in the case accommodating area, is generally understood.

SUMMARY OF THE INVENTION

The present invention is directed to a hand tool case holding device including a holding device housing, a case accommodating area, and a charging coil, which is provided for the purpose of transferring energy into a hand tool case situated in the case accommodating area.

It is provided that the hand tool case holding device has a holding device, which is provided for the purpose of detachably fixing at least the holding device housing independently of the hand tool case. In particular, a "holding device housing" is to be understood as a unit, which, in an operationally ready state, mechanically connects at least the charging coil and the holding device. The holding device housing may enclose an interior chamber, in which a charging electronic system of the hand tool case holding device is advantageously situated. A "charging electronic system" is to be understood in particular as an electronic system which monitors a charge state of a hand tool battery and, dependent thereon, controls and/or may regulate a charging operation of the hand tool battery. A "hand tool battery" is to be understood in particular as a battery which is provided for the purpose of supplying a hand tool with energy. The hand tool battery may be connected to the hand tool so it is detachable without tools in particular.

Alternatively or additionally, a hand tool battery could be integrated into the hand tool. In particular, a "hand tool" is to be understood as a portable tool which appears reasonable to those skilled in the art, but advantageously as a drill, a drill hammer, a percussion hammer, a saw, a plane, a screwdriver, a milling machine, a grinder, an angle grinder, a gardening tool, a construction site measuring device, and/or a multifunction tool. "Provided" is to be understood in particular to mean specially programmed, configured, and/or equipped. A "case accommodating area" is to be understood in particular to mean an area of the hand tool case holding device, in which the hand tool case is situated at least during a charging operation of a hand tool battery situated in the hand tool case. A holding device housing of the hand tool case holding device may delimit the case accommodating area on at least one side.

In particular, a "hand tool case" is to be understood as a casing which, in a closed state, delimits a tool accommodating area in a shock-proof, moisture-proof, and/or dust-proof manner. The hand tool case may delimit the tool accommodating area at least partially in the form of a hand tool battery. The hand tool case may have at least one fastening arrangement for fastening a hand tool, a hand tool including an attached hand tool battery, and/or particularly may be a hand tool battery. The hand tool case may be magnetically passive and/or advantageously electrically passive. In particular, the hand tool case does not have any electrical equipment. Alternatively or additionally, the hand tool case could have a charging coil and/or advantageously a magnetic field conductor, which receives the energy and relays it in a hard-wired and/or magnetic manner to a hand tool battery.

The hand tool case may be configured corresponding to the hand tool case in publication DE 10 2008 058 007 B3, but it has a hand tool accommodating area and/or a hand tool battery accommodating area, which is provided for the purpose of accommodating an inductively charged hand tool battery during a charging operation. In particular, the term "transferred" is to be understood to mean that the charging coil transmits electrical energy with the aid of a magnetic alternating field to the charging coil situated in the case accommodating area. The charging coil situated in the case accommodating area may be part of the hand tool case and/or particularly may be part of a hand tool battery situated in the hand tool case. A "holding device" is to be understood in particular as a device which, in at least one operating state, establishes a mechanically fixed connection between two units. The holding device may be provided for the purpose of fixing the holding device housing at a usage site, for example, at a workplace, on a wall, in a vehicle, and/or on another object which appears reasonable to those skilled in the art. The phrase "independently of the hand tool case" is to be understood in particular to mean that an arrangement and/or a presence of the hand tool case in the case accommodating area does not have any influence on the mechanically fixed connection of the holding device.

In particular, the holding device establishes a connection to an object different from the hand tool case, into which the energy is transferred, for example, another hand tool case, a vehicle, and/or a shelf. In particular, the term "detachable" is to be understood to mean that the holding device fixes the hand tool case in one state and this fixing is separable nondestructively and/or reversibly by an operator in another state. Due to the embodiment according to the present invention of the hand tool case holding device, particularly flexible fixing is possible. In particular, the hand tool case holding device may be fixed comfortably at different usage sites and under different usage conditions.

Furthermore, it is provided that the hand tool case holding device includes a further holding device, which is provided for the purpose of detachably fixing the hand tool case in the case accommodating area, whereby a particularly stable, user-friendly, and in particular automatically closing fastening of the hand tool case in the case accommodating area is possible with a simple configuration. The further holding device may be provided for the purpose, in at least one operating state, of preventing a movement of the hand tool case out of the case accommodating area. The holding device may prevent, in at least one operating state, a movement of the hand tool case independently of a direction of the movement. The holding device may hold the hand tool case in a force-fit manner and/or advantageously in a form-locked manner at least during a charging operation. The holding devices may be situated on sides of the holding device housing which face away from one another.

In another embodiment, it is provided that the holding devices are implemented as corresponding to one another, whereby multiple hand tool cases and hand tool case holding devices may advantageously be stacked. In this context, "corresponding" is to be understood in particular to mean that a holding device of a first hand tool case holding device, which is provided for the purpose of detachably fixing at least the holding device housing independently of the hand tool case, and a holding device of a second hand tool case holding device, which is provided for the purpose of detachably fixing the hand tool case in the case accommodating area, are implemented as connectable to one another.

Furthermore, it is provided that at least one of the holding devices is implemented as detachable without tools, whereby particularly comfortable removal of the hand tool case from the case accommodating area is possible. Both holding devices may be implemented as detachable without tools. The phrase "detachable without tools" is to be understood in particular to mean that a connection of the holding device is implemented as detachable by hand by an operator. The holding device may have at least one operating element, which detaches a fixing in the event of an actuation by an operator.

Furthermore, it is provided that at least the further holding device has at least one holding arrangement, which is provided for the purpose of latching the hand tool case, whereby a particularly stable, user-friendly, and in particular automatically closing fastening is possible with a simple configuration. A "holding arrangement" is to be understood in particular as a arrangement which, in at least one operating state, causes a force to act directly on the tool case for fixing the tool case.

The holding arrangement may be implemented as corresponding to a holding arrangement and/or according to a holding arrangement in publication DE 10 2008 058 007 B3. In particular, "latching" is to be understood to mean that a holding arrangement is elastically deflected during a fastening operation of the hand tool case, to subsequently hook behind a corresponding holding arrangement by way of a force acting on the holding arrangement. The elastically deflectable holding arrangement may be situated on the hand tool case and the corresponding holding arrangement is situated on the hand tool case holding device.

In addition, it is provided that the further holding device has two holding arrangement, which are situated on two opposing sides of the case accommodating area, whereby a particularly reliable fixing is possible with a simple configuration. The phrase "on two opposing sides" is to be understood in particular to mean that the holding arrangement lie on a straight line, which intersects the case accommodating area and which are aligned at least essentially parallel to one side of the case accommodating area. Both holding devices may each have two holding arrangement, which are implemented as corresponding to one another in particular.

Furthermore, it is provided that the holding devices are situated on sides of the holding device housing facing away from one another, whereby advantageous stacking is possible. The holding devices may be provided for the purpose of fixing a hand tool case in particular on opposing sides.

In one advantageous embodiment of the present invention, it is provided that the hand tool case holding device includes a charging electronic system, which is provided for the purpose of at least controlling a charging operation, whereby a charging electronic system situated in the hand tool case may be omitted. A particularly simple configuration of the hand tool case is thus possible. A "charging electronic system" is to be understood in particular as an electronic system which monitors a charge state of the hand tool battery and, depending thereon, controls and/or may regulate an energy transfer to the hand tool battery.

Furthermore, it is provided that a main extension of the holding device housing is aligned essentially perpendicularly to an action direction of the charging coil, whereby a particularly small overall size may be achieved. A "main extension" of the holding device housing is to be understood in particular as a plane in which the holding device housing has a maximum extension and which may be aligned parallel to an outer side of the holding device housing. The main extension may be aligned parallel to an outer side of the holding device housing which faces toward the case accommodating area. In particular, an "action direction" is to be understood as a direction in which the charging coil transfers energy during a charging operation.

In addition, it is provided that the hand tool case holding device includes a cooling device, which is provided for the purpose of at least partially compensating for waste heat arising during a charging operation, whereby the charging operation may be carried out in an advantageously large ambient temperature range. In particular, the cooling device reduces a heat transfer in the direction of the hand tool battery. The cooling device may be provided for the purpose of dissipating the waste heat with the aid of heat radiation, heat conduction, and/or convection. The cooling device particularly may have a latent heat storage element which compensates for the waste heat. A "latent heat storage element" is to be understood in particular as an element which has at least one latent heat storage material and/or one latent heat storage material mixture having at least one phase boundary, in the event of which it is exceeded, the latent heat storage material absorbs or dissipates a quantity of heat per unit of mass which is at least five times, in particular at least 10 times, advantageously at least 20 times, which may be at least 40 times as great as a quantity of heat which the same latent heat storage material absorbs in the event of heating by 1 K beyond the phase boundary.

In particular, the quantity of heat is at least 60 kJ/kg, in particular at least 100 kJ/kg, advantageously at least 130 kJ/kg, which may be at least 150 kJ/kg. A "phase boundary" is to be understood in particular as a limiting temperature, which is generally pressure-dependent. The limiting temperature of the at least one phase boundary of the at least one latent heat storage material, at least at a normal pressure of 1013 hPa, may be a temperature greater than $-10°$ C., in particular greater than $-5°$ C., advantageously greater than $0°$ C., which may be greater than $5°$ C. The limiting temperature of the at least one phase boundary, at least at normal pressure, may be less than $60°$ C., in particular less than $55°$ C., advantageously less than $50°$ C., which may be less than $45°$ C. The latent heat storage element may be provided for the purpose, when the phase boundary is exceeded in the opposite direction, of dissipating or absorbing the absorbed or dissipated heat again, respectively, to the same extent. The phase boundary may be reversibly exceeded with arbitrary frequency. The latent heat storage element may be provided for the purpose, in the event at least one phase boundary is exceeded, of absorbing a heat of at least 5 kJ, in particular at least 10 kJ, advantageously at least 20 kJ, which may be at least 30 kJ. In particular, a transition between a liquid state and a solid state occurs at the phase boundary.

Furthermore, a system including a hand tool case holding device according to the present invention and at least one hand tool case is provided, which has at least one holding device corresponding to the holding device of the hand tool case holding device, whereby the hand tool case holding device is advantageously connectable to various hand tool cases. In this context, "corresponding" is to be understood in particular to mean that the holding device of the hand tool case is provided for the purpose of establishing a detachable mechanical connection to the holding device of the hand tool case holding device. The hand tool case may have, in addition to the first holding device, a second holding device, which is implemented as corresponding to a first holding device of a hand tool case, whereby multiple hand tool cases may be connected, advantageously stacked, and in particular transported with the aid of the holding devices. The second holding device of the hand tool case may be implemented identically to the holding device of the hand tool case holding device.

Further advantages result from the following description of the drawings. An exemplary embodiment of the present invention is shown in the drawings. The drawings, the description, and the claims contain numerous features in combination. Those skilled in the art will also advantageously consider the features individually and combine them to form further reasonable combinations.

DETAILED DESCRIPTION

FIGS. 1 through 5 show various applications of a system 34 according to the present invention at least including a hand tool case holding device 10, a hand tool case 18, a hand tool battery 40, and a fastening arrangement 42 in different combinations. Hand tool case holding device 10 has a holding device housing 12, a case accommodating area 14, two charging coils 16, a first holding device 20, a further, second holding device 22, and a charging electronic system 28. Holding device housing 12 is implemented as essentially board-shaped. Holding device housing 12 connects charging coil 16 and the two holding devices 20, 22 to one another. Charging electronic system 28 is situated in an interior of holding device housing 12. Charging electronic system 28 regulates energy which at least one of charging coil 16 transfers to hand tool battery 40 during a charging operation. Charging coil 16 has an action direction 32, which is perpendicular to a main extension 30 of holding device housing 12.

Figure 1:
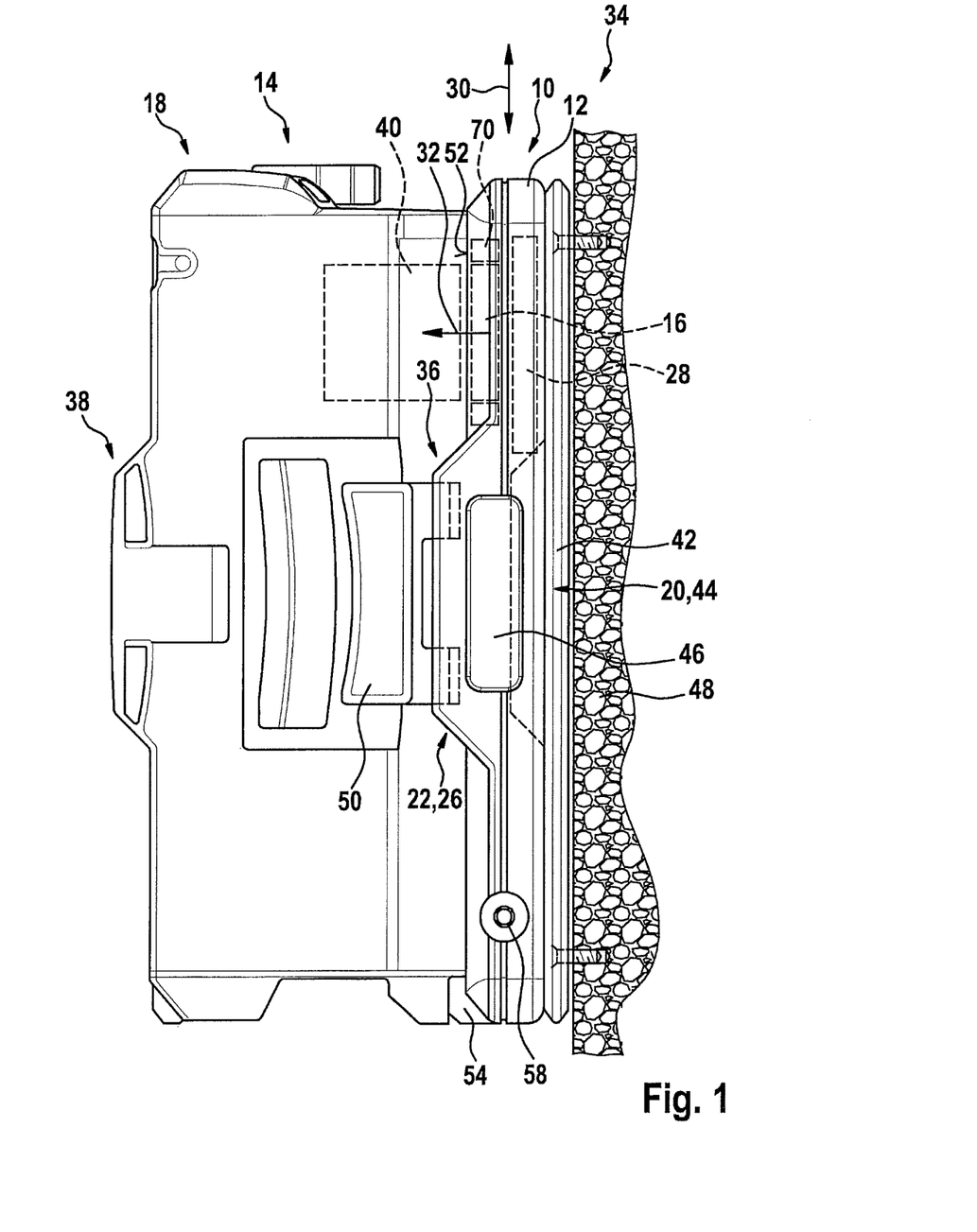
FIG. 1 shows a system according to the present invention including a hand tool case and a hand tool case holding device, which has a first holding device and a further, second holding device, in a side view.

First holding device 20 of hand tool case holding device 10 fixes holding device housing 12 in at least one operating state (shown in FIG. 1), on fastening arrangement 42 so it is detachable independently from hand tool case 18. First holding device 20 of hand tool case holding device 10 latches, in one operating state, with a holding device 44 of fastening arrangement 42. Hand tool case holding device 10 has operating elements 46, which are provided for the purpose, upon an actuation without tools by the operator, of detaching a connection between hand tool case holding device 10 and fastening arrangement 42. Fastening arrangement 42 is provided for the purpose of being fixed at a usage site of hand tool case holding device 10, for example, on a wall 48, in a vehicle, on a workbench, and/or another site which appears reasonable to those skilled in the art, whereby hand tool case holding device 10 may advantageously be fixed at different sites. FIG. 1 shows that fastening arrangement 42 is screwed onto wall 48.

Further, second holding device 22 of hand tool case holding device 10 is provided for the purpose of detachably fixing hand tool case 18 in case accommodating area 14. For this purpose, second holding device 22 of hand tool case holding device 10, in at least one operating state, connects holding device housing 12 detachably to a first holding device 36 of hand tool case 18. First holding device 36 of hand tool case 18 has operating elements 50, which are provided for the purpose, upon an actuation without tools by the operator, of detaching a connection between hand tool case holding device 10 and hand tool case 18. Holding devices 20, 22 of hand tool case holding device 10 are situated on sides of holding device housing 12 facing away from one another. A second holding device 38 of hand tool case 18 is situated on a side of hand tool case 18 facing away from first holding device 36.

Figure 3:
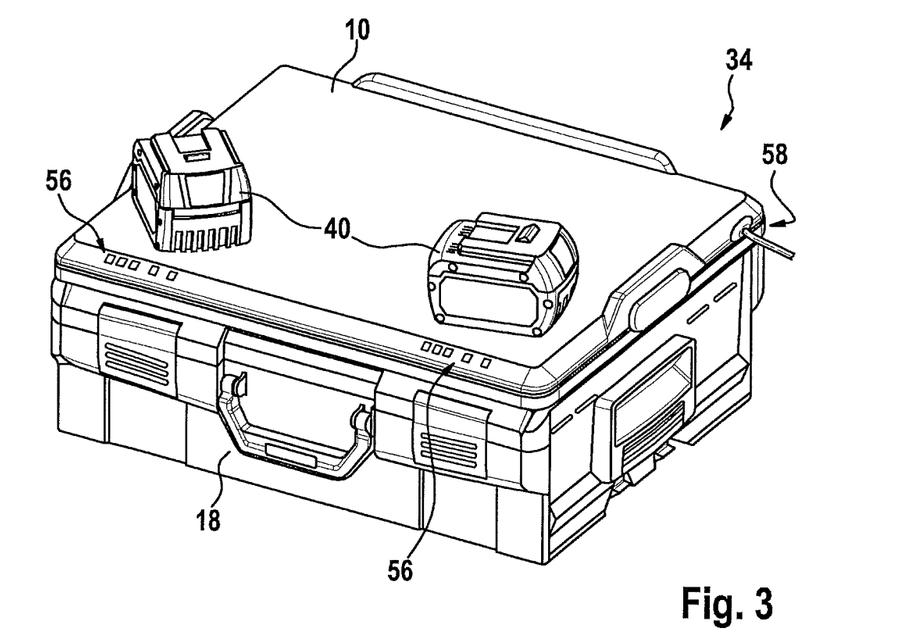
FIG. 3 shows the system from FIG. 1 including two hand tool batteries in a perspective view, the hand tool case holding device being situated on a cover side of the hand tool case.
Figure 4:
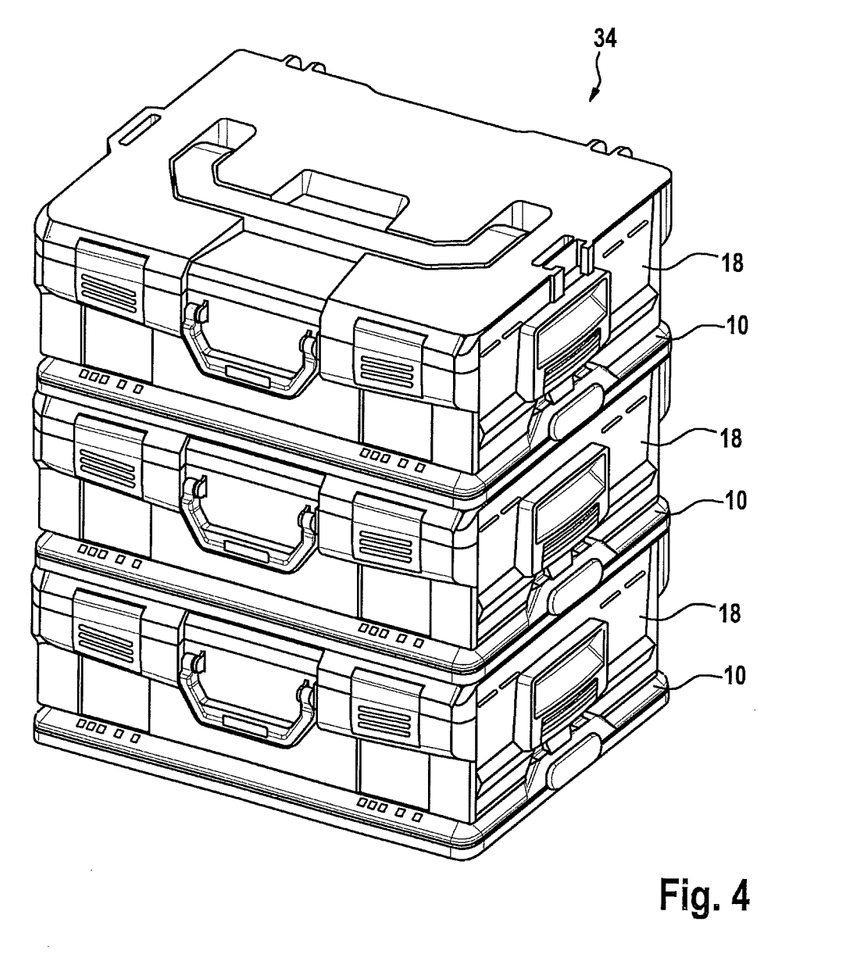
FIG. 4 shows a system made of multiple hand tool cases and multiple hand tool case holding devices, the hand tool cases and the hand tool case holding devices being stacked alternately.

First holding device 20 of hand tool case holding device 10 is implemented as corresponding to second holding device 22 of hand tool case holding device 10 and second holding device 38 of hand tool case 18. Second holding device 22 of hand tool case holding device 10 is implemented as corresponding to first holding device 20 of hand tool case holding device 10 and first holding device 36 of hand tool case 18. Hand tool case holding devices 10 and hand tool cases 18 are therefore detachably connected and stackable, as shown in FIGS. 3 and 4.

Holding devices 20, 22, 36, 38, 44 each have two holding arrangements 24, 26. The two holding arrangements 24, 26 are each situated spaced apart from one another. Holding arrangement 24, 26 of second holding device 22 of hand tool case holding device 10 are situated on two opposing sides of case accommodating area 14. The two holding arrangements 24, 26 are each provided for the purpose of latching with one holding arrangement 24, 26 of a corresponding holding device 20, 22, 36, 38, 44. Holding arrangement 24, 26 of first holding devices 20, 36 are implemented as engagement hooks. Holding arrangement 24, 26 of second holding devices 22, 38 and holding device 44 of fastening arrangement 42 are incremented as recesses. Holding arrangement 24, 26 of first holding devices 20, 36 latch with a movement outward. Holding arrangement 24, 26 of first holding devices 20, 36 have pushing-in bevels (not shown in greater detail), which automatically push in holding arrangement 24, 26 before latching, and do so both during an insertion movement parallel to main extension 30 of hand tool case holding device 10 and also during a movement perpendicular to main extension 30 of hand tool case holding device 10.

Figure 2:
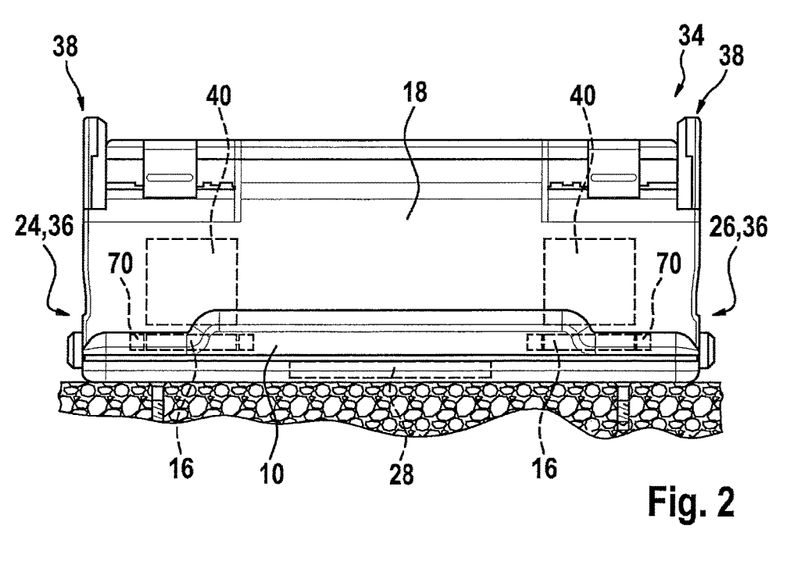
FIG. 2 shows the system from FIG. 1 in a frontal view.

During a charging operation, at least one of charging coils 16 transfers energy to one of hand tool batteries 40, which is situated in case accommodating area 14. FIGS. 1 and 2 show that charging coils 16 transfer energy through a wall of hand tool case 18 into hand tool case 18 situated in case accommodating area 14. In addition, charging coils 16, as shown in FIG. 3, may transfer energy to hand tool batteries 40, which rest on a surface 52 of hand tool case holding device 10. For this purpose, surface 52 has markings (not shown in greater detail), which assist the operator during positioning of hand tool batteries 40. Alternatively or additionally, a surface of a hand tool case holding device could have holding arrangement for fixing a hand tool battery.

Holding device housing 12 has a support area 54, which supports a part of a weight force of hand tool case 18 in the case of a perpendicular installation of hand tool case holding device 10. Hand tool case holding device 10 has output units 56, which indicate a charge state of hand tool battery 40. Furthermore, hand tool case holding device 10 has an energy input 58, which absorbs energy transferred to hand tool battery 40 during a charging operation.

Hand tool case holding device 10 includes a cooling device 70. Cooling device 70 partially compensates for waste heat arising during a charging operation. Cooling device 70 is implemented as a latent heat storage element which compensates for the waste heat. Cooling device 70 is situated adjoining the charging coil. Cooling device 70 encloses charging coil 16 of hand tool case holding device 10 on a plane perpendicular to action direction 32 of charging coil 16.

Figure 5:
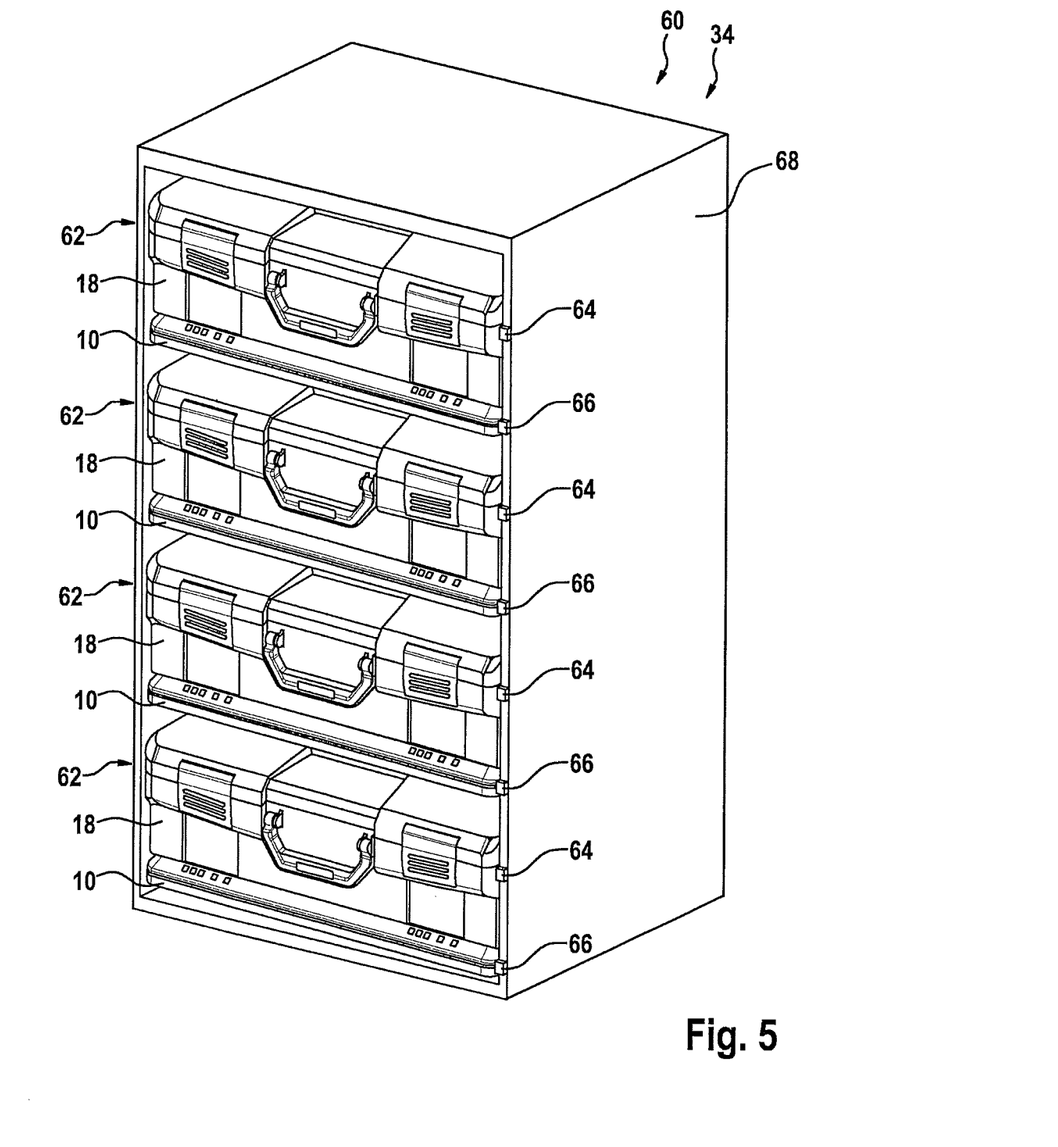
FIG. 5 shows a system made of multiple hand tool cases, multiple hand tool case holding devices, and a system rack.

FIG. 5 shows system 34 of FIGS. 1 through 4 and additionally a system rack 60, which is provided for the purpose of fixing multiple hand tool case holding devices 10. System rack 60 has multiple accommodating areas 62 for one hand tool case holding device 10 and one hand tool case 18 in each case. System rack 60 has operating elements 64, which are provided for the purpose of detaching a connection between one of hand tool case holding devices 10 and one of hand tool cases 18. Furthermore, system rack 60 has operating elements 66, which are provided for the purpose of detaching a connection between one of hand tool case holding devices 10 and a housing 68 of system rack 60.

What is claimed is:

1. A hand tool case holding device, comprising:
   a holding device housing;
   a case accommodating area, wherein the case accommodating area includes a surface in which a hand tool case is configured to be situated upon,
   a charging coil for transferring energy into a hand tool case situated in the case accommodating area;
   a holding device for mechanically and detachably fixing at least the holding device housing to a surface of an object independently of the hand tool case; and
   a further holding device for detachably fixing the hand tool case in the case accommodating area,
   wherein the further holding device has two holding arrangements situated on two opposing sides of, and external to, the case accommodating area,
   wherein the holding device and the further holding device are situated on opposite sides of a plane parallel to a longitudinal axis of the holding device housing.

2. The hand tool case holding device of claim 1, wherein the holding device and the further holding device are implemented as corresponding to one another.

3. The hand tool case holding device of claim 1, wherein at least one of the holding device and further holding device is implemented as detachable without tools.

4. The hand tool case holding device of claim 1, wherein at least the further holding device has at least one holding arrangement for latching the hand tool case.

5. The hand tool case holding device of claim 1, further comprising:
   a charging electronic system for at least controlling a charging operation.

6. The hand tool case holding device of claim 1, wherein a main extension of the holding device housing is aligned essentially perpendicularly to an action direction of the charging coil.

7. The hand tool case holding device of claim 1, further comprising:
   a cooling device for at least partially compensating for waste heat arising during a charging operation.

8. A system, comprising:
   a hand tool case holding device, including a holding device housing, a case accommodating area, wherein the case accommodating area includes a surface in which a hand tool case is configured to be situated upon, a charging coil for transferring energy into the hand tool case situated in the case accommodating area, and a holding device for mechanically and detachably fixing at least the holding device housing to a surface of an object independently of the hand tool case;
   the hand tool case having at least one further holding device corresponding to the holding device of the hand tool case holding device,
   wherein the at least one further holding device is configured to detachably fix the hand tool case in the case accommodating area,
   wherein the at least one further holding device has two holding arrangements situated on two opposing sides of, and external to, the case accommodating area,
   wherein the holding device and the further holding device are situated on opposite sides of a plane parallel to a longitudinal axis of the holding device housing.

9. A hand tool case holding device, comprising:
   a holding device housing;
   a case accommodating area, wherein the case accommodating area includes a surface in which a hand tool case is configured to be situated upon;
   a charging coil for transferring energy into a hand tool case situated in the case accommodating area;
   a holding device for mechanically and detachably fixing at least the holding device housing to a surface of an object independently of the hand tool case; and
   a further holding device for detachably fixing the hand tool case in the case accommodating area,
   wherein the holding device and the further holding device are implemented as corresponding to one another,
   wherein the holding device and the further holding device are situated on opposite sides of a plane parallel to a longitudinal axis of the holding device housing.

10. The hand tool case holding device of claim 9, wherein at least one of the holding device and the further holding device is implemented as detachable without tools.

11. The hand tool case holding device of claim 9, wherein at least the further holding device has at least one holding arrangement for latching the hand tool case.

12. The hand tool case holding device of claim 9, wherein the further holding device has two holding arrangements situated on two opposing sides of the case accommodating area.

13. The hand tool case holding device of claim 9, further comprising: a charging electronic system for at least controlling a charging operation.

14. The hand tool case holding device of claim 9, wherein a main extension of the holding device housing is aligned essentially perpendicularly to an action direction of the charging coil.

15. The hand tool case holding device of claim 9, further comprising: a cooling device for at least partially compensating for waste heat arising during a charging operation.

* * * * *